United States Patent
Patro et al.

(10) Patent No.: US 8,341,044 B1
(45) Date of Patent: *Dec. 25, 2012

(54) SYSTEM, METHOD, AND COMPUTER PROGRAM PRODUCT FOR RATING AND RE-RATING EVENTS

(75) Inventors: Debabrata Patro, Pune (IN); Yael Angel, Ramat Gun (IL); Yishay Levanoni, Or-Yehuda (IL); Omer Shani, Savyon (IL)

(73) Assignee: Amdocs Software Systems Limited, Dublin (IE)

( * ) Notice: Subject to any disclaimer, the term of this patent is extended or adjusted under 35 U.S.C. 154(b) by 988 days.

This patent is subject to a terminal disclaimer.

(21) Appl. No.: 11/758,582

(22) Filed: Jun. 5, 2007

(51) Int. Cl.
- *G07F 19/00* (2006.01)
- *G06F 15/02* (2006.01)
- *G06Q 40/00* (2006.01)
- *H04M 15/00* (2006.01)

(52) U.S. Cl. ......... 705/34; 705/32; 705/40; 379/114.03; 379/121.02; 379/127.05

(58) Field of Classification Search .................. None
See application file for complete search history.

(56) References Cited

U.S. PATENT DOCUMENTS

| | | | |
|---|---|---|---|
| 6,456,986 B1* | 9/2002 | Boardman et al. | 705/400 |
| 7,418,426 B1* | 8/2008 | Reunert et al. | 705/40 |
| 2006/0008063 A1* | 1/2006 | Harnesk et al. | 379/114.01 |
| 2006/0248010 A1 | 11/2006 | Krishnamoorthy et al. | 705/40 |
| 2007/0036312 A1* | 2/2007 | Cai et al. | 379/126 |
| 2007/0050308 A1* | 3/2007 | Latvala et al. | 705/80 |
| 2008/0130850 A1* | 6/2008 | Bencheqroun et al. | 379/114.04 |

OTHER PUBLICATIONS

Revenue Management 2007, "Progressing Your Revenue Assurance, Risk and Credit Management Strategies to Revenue Management to Minimise Revenue Loss, Optimise Revenue Growth and Improve Business Process Efficiencies," IIR Telecoms & Technology, 2007, United Kingdom, 6 pages.

Hewlett-Packard, Portal, Microsoft, and Intel Corporation, "Maximize Profitability Through Convergent Billing, Solution Blueprint," 2002, USA, 15 pages.

\* cited by examiner

*Primary Examiner* — Fahd Obeid
(74) *Attorney, Agent, or Firm* — Zilka-Kotab, PC

(57) ABSTRACT

A system, method, and computer program product are provided for re-rating events, in use, a plurality of events associated with at least one customer is rated. Additionally, at least one of the events associated with the customer(s) is re-rated, in parallel with the rating.

21 Claims, 7 Drawing Sheets

SYSTEM, METHOD, AND COMPUTER PROGRAM PRODUCT FOR RATING AND RE-RATING EVENTS

FIELD OF THE INVENTION

The present invention relates to billing systems, and more particularly to rating and re-rating events.

BACKGROUND

Generally speaking, rating refers to the determination of an amount to be charged for a particular billable event. In prior art billing systems, a rater is typically stopped when any re-rating is required, after which events are re-rated. This makes it impossible to support re-rating in a prepaid environment where there are events to be processed in real-time and the rating cannot necessarily be stopped when re-rating is to be done.

In prior art billing systems, it is also necessary to re-rate events from a beginning of a bill cycle, when any re-rating is required. Such systems thus require re-rating of an increasing number of events as time progresses towards an end of the bill cycle even if the events from an earlier period of the bill cycle do not need any re-rating.

There is thus a need for addressing these and/or other issues associated with the prior art.

SUMMARY

A system, method, and computer program product are provided for re-rating events. In use, a plurality of events associated with at least one customer is rated. Additionally, at least one of the events associated with the customer(s) is re-rated, in parallel with the rating.

DETAILED DESCRIPTION

Figure 1:
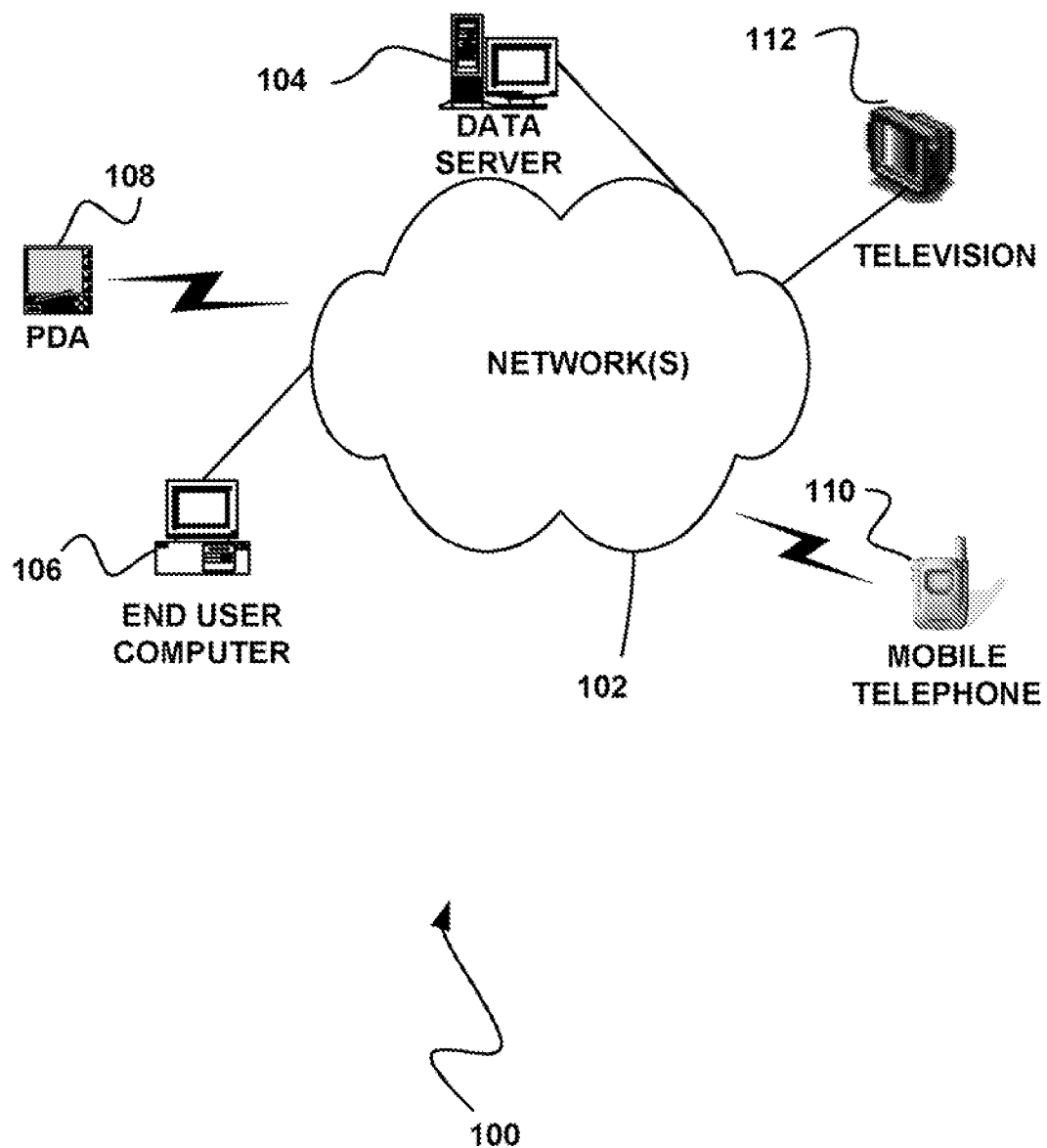
FIG. 1 is rates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
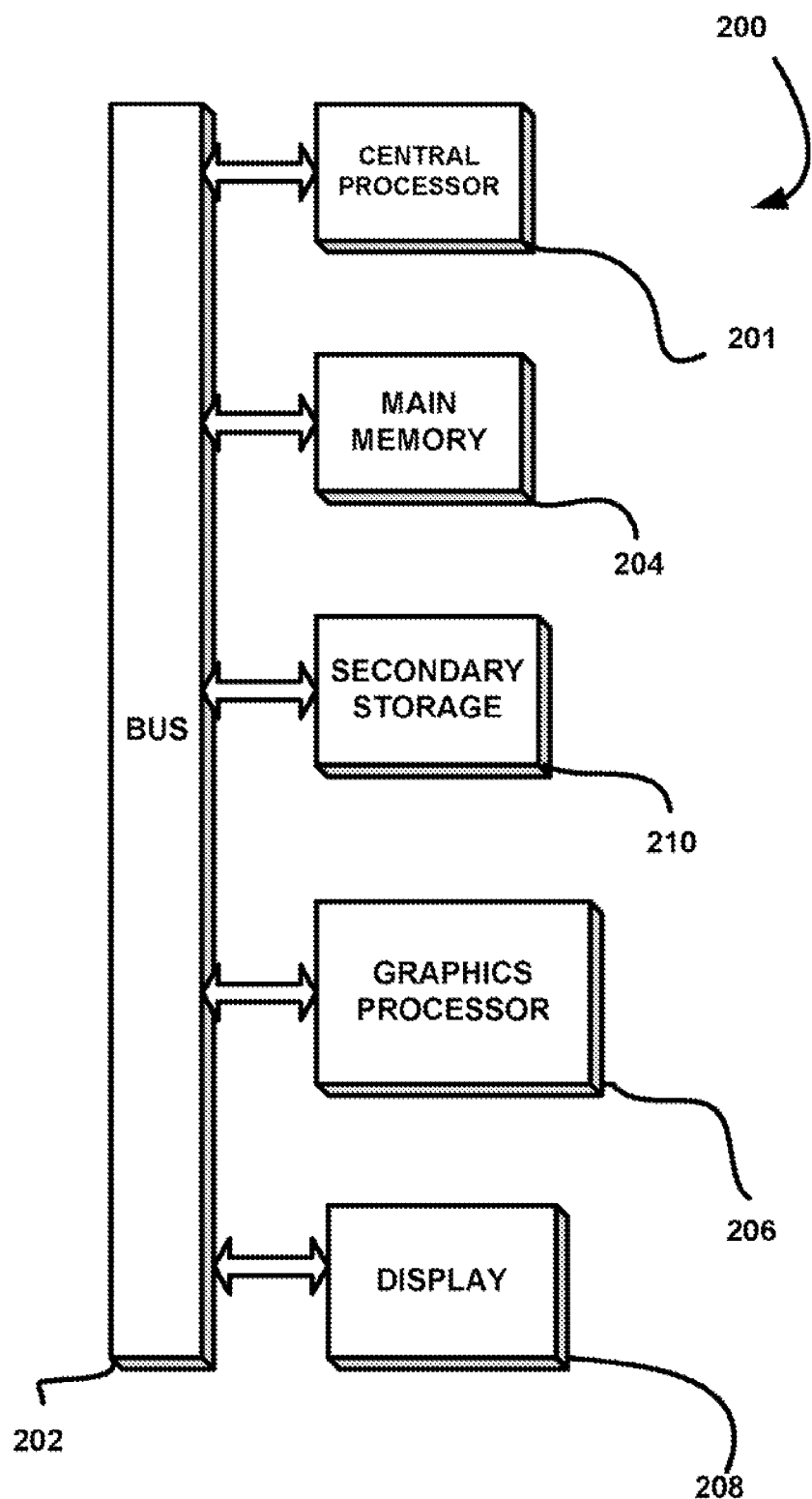
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.] The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions. Memory 204, storage 210 and/or any other storage are possible examples of computer-readable media.

Figure 3:
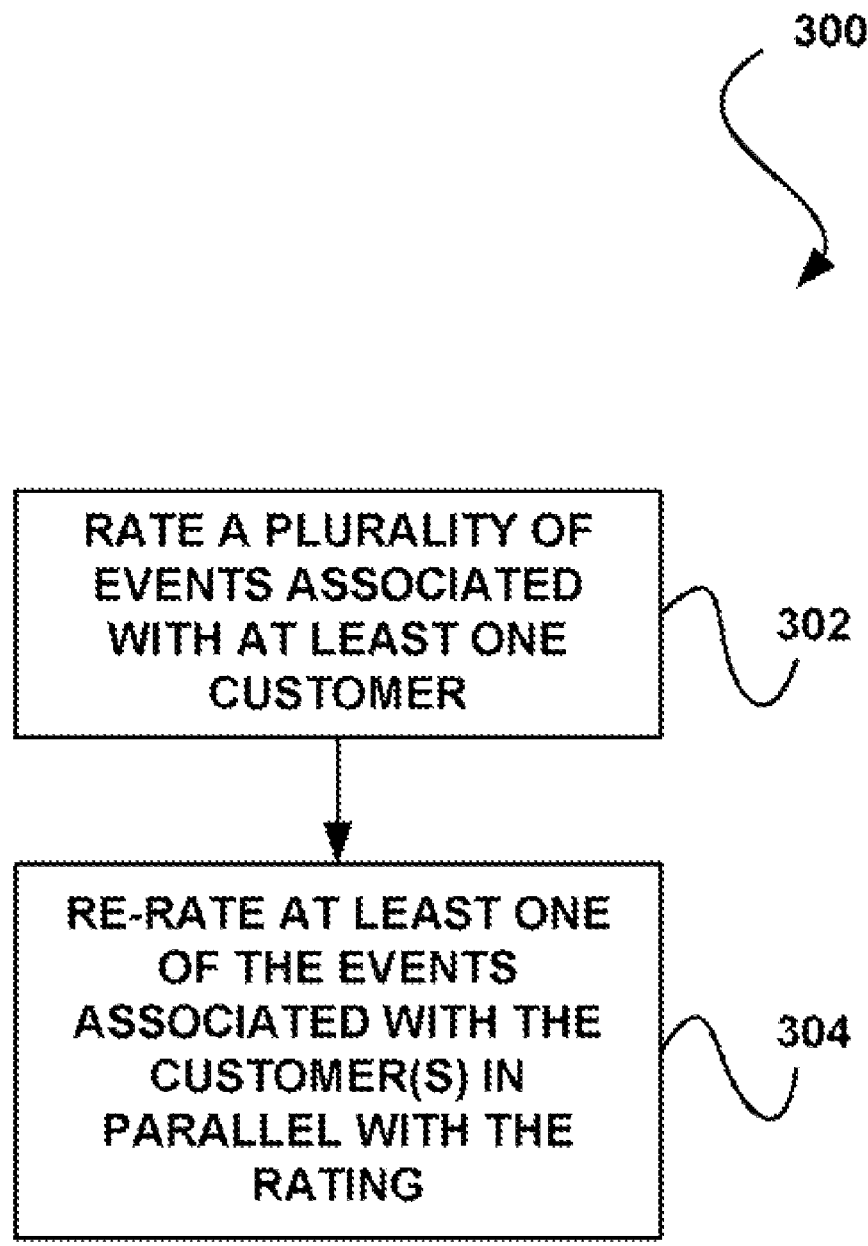
FIG. 3 shows a method for rating and re-rating events in parallel, in accordance with one embodiment.

FIG. 3 shows a method 300 for rating and re-rating events in parallel, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

In the context of the present description, rating refers to the activity of determining a chargeable amount which may be either a monetary amount or non-monetary amount (or a combination of both) in association with an event. For example, in various embodiments, rating may include, but is not limited to determining an amount to be charged for an event, a cost of an event, and/or any other rating that meets the above definition.

Also, in the context of the present description, re-rating refers to the activity of re-determining the chargeable amount which may be either a monetary amount or non-monetary amount (or a combination of both) in association with the event. For example, in various embodiments, re-rating may include, but is not limited to re-determining the amount to be charged for an event, the cost of an event, and/or any other re-rating that meets the above definition.

Still yet, in the present description, events refer to any type of occurrence that warrants the determination of a chargeable amount in association therewith. For example, in various embodiments, events may include, but are not limited to phone calls, internet use, downloads, music/video services, gaming services, and/hr any other event that meets the above definition.

As shown in operation 302, a plurality of events associated with at least one customer is rated. Such rating may be accomplished in any desired manner. For example, in one embodiment, the rating may be accomplished utilizing any desired system such as the system as shown in FIG. 2. Additionally, such rating may or may not be accomplished over a network, such as the network shown in FIG. 1, for example.

In some optional embodiments, the events associated with the customer(s) may be events which involve the use of any number of devices corresponding with any number of services. For example, in one embodiment, such events associated with the customer(s) may be events which involve the use of a service corresponding to one of the plurality of devices shown in FIG. 1. In the context of the present description, a customer refers to any individual or entity utilizing a purchased good or service. For example, in various embodiments, customers may include, but are not limited to users of telecommunication services, gaming services, and/or any other customer that meets the above definition.

With continuing reference to FIG. 3, at least one of the events associated with the customer(s) is re-rated in parallel with the rating. See operation 304. Such re-rating may be accomplished in variety of ways, utilizing data from at least one event associated with the set of customers.

For example, in one embodiment, the re-rating may be accomplished utilizing any desired system, such as the system as shown in FIG. 2. Additionally, such re-rating may or may not be accomplished over a network, such as the network shown in FIG. 1, for example. It should be noted that, in various embodiments, the rating and re-rating may be accomplished using the same or separate systems. It should also be noted that the present techniques may be applied to pre-paid, post-paid, hybrid, etc environments.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
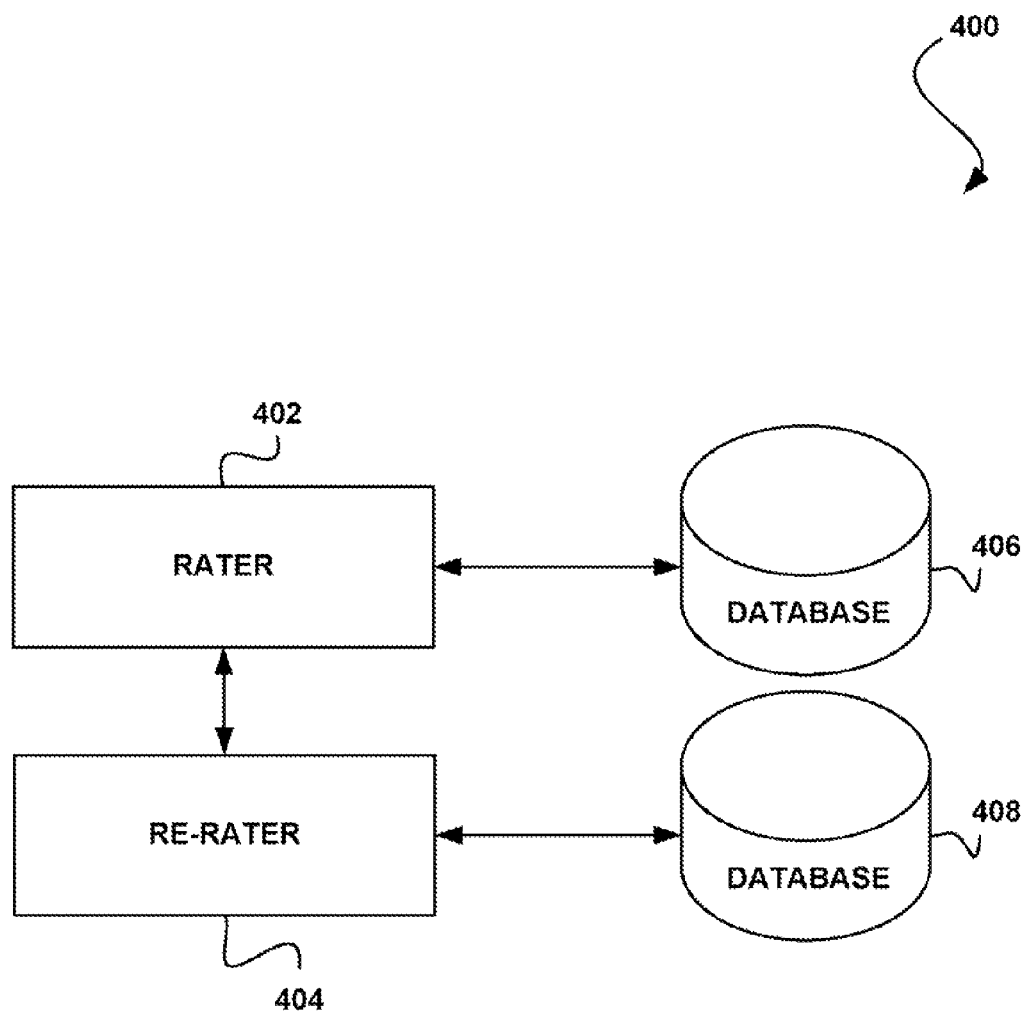
FIG. 4 shows a system for rating and re-rating events in parallel, in accordance with one embodiment.

FIG. 4 shows a system 400 for rating and re-rating events in parallel, in accordance with one embodiment. As an option, the system 400 may be implemented in the context of the details of FIGS. 1-3. Of course, however, the system 400 may be carried out in any desired environment. Further, the aforementioned definitions may equally apply to the description below.

As shown in FIG. 4, a rater 402 interfaces with a re-rater 404. Such interface may or may not be over a network, such as the network shown in FIG. 1, for example. Additionally, the rater 402 and/or the re-rater 404 may implemented using any desired system, such as the system shown in FIG. 2, for example.

Furthermore, the rater 402 interfaces with a first database 406. Again, such interface may or may not be over a network, such as the network shown in FIG. 1, for example. Additionally, the first database 406 may or may not be implemented in the same system as the rater 402.

In addition, the re-rater 404 interfaces with a second database 408. In one embodiment, the first database 406 may be logically and/or physically separate from the second database 408. Further, such interface may or may not be over a network, similar to the rater 402/first database 406 interface. Additionally, the second database 408 may or may not be implemented in the same system as the re-rater 404.

It should be noted that, in one embodiment, the rater 402 may be utilized to rate one or more events associated with one or more customers. Such rating may be accomplished in a variety of ways. For example, the rating process may take into account various event data and performance indicators stored in the first database 406 when rating events. As an option, such rating may be done in real-time or near real-time. Still yet, in another embodiment, such rating may be accomplished utilizing a pre-paid billing system of which the rater 402 and/or the re-rater 404 may be a component.

In one possible embodiment, the re-rater 404 may be used to re-rate the event(s) associated with the customer(s). Furthermore, the re-rater 404 may utilize the second database 408 to update performance indicators in conjunction with a re-rating process. At the same time the re-rater 404 is re-rating events utilizing the second database 408, the rater 402 may utilize the first database 406 for the rating process.

For example, in one embodiment, the rater 402 may begin to rate events associated with a set of customers based on event data provided in the first database 406. Once it is determined that one or more events should be re-rated (e.g. based on a condition being met), the re-rater 404 may send a notification to the rater 402 including information on which of the set of customers is to be subject to the re-rating. The rater 402 may then send the event(s) associated with such subset of customers to the re-rater 404. As a result, the re-rating process may be invoked and performed while the rating of the events (associated with the same set of customers) concurrently continues.

It should be noted that, in the context of the present description, event data refers to any data relating to an event, where such event data may be used for rating, re-rating, etc. For example, in various embodiments, the event data may include, but are not limited to time properties of a call (e.g. day of week, date, time of day, etc.), an amount of usage (e.g. duration of a call, amount of data transferred, number of messages received, a number of songs downloaded, etc.), a destination of a call (e.g. land line, overseas, etc.), an origin of a call, a location of a call, premium charges, and/or any other event data that meets the above definition.

Furthermore, in the context of the present description, performance indicators refer to any metric used to quantify performance. For example, in various embodiments, the performance indicators may include, but are not limited to an accumulation of call time, a number of calls, an amount of data transferred, a number of messages received, a number of songs downloaded, an accumulation of event data, and/or any other performance indicator that meets the above definition. In the specific context of telecommunications, the performance indicator may be the accumulation of data relating to a number of calls by a customer, total amount of "free minutes" or allowance used by the customer, total amount of usage charges, duration of call made as per various time periods, etc.

Once the event(s) to be re-rated has been sent to the re-rater 404 by the rater 402, the re-rater 404 may then initialize and update various performance indicators (e.g. accumulators) using the second database 408. The rater 402 may continue rating events using the first database 406 while the re-rater 404 updates the various performance indicators in the re-rating process.

After the event(s) has been re-rated by the re-rater 404, the re-rating results may be sent to the first database 406, in order to be updated, for example. It should be noted that the re-rating results may be sent to the first database in a variety of ways. For example, in one embodiment, the re-rater 404 may send the re-rating results to the rater 402, and the rater 402 may then update the first database 406. Additionally, a separate module may be used to send the re-rating results to the first database 406.

It should be noted that a customer may have both re-rateable and non-re-rateable services which are accumulated to different performance indicators, in different embodiments. For example, a user of the system 400 may have post-paid and pre-paid subscribers which do not share the same packages (e.g. allowances, discounts, spending limits, etc.). In such case, the services may be accumulated to different performance indicators, for example.

Figure 5:
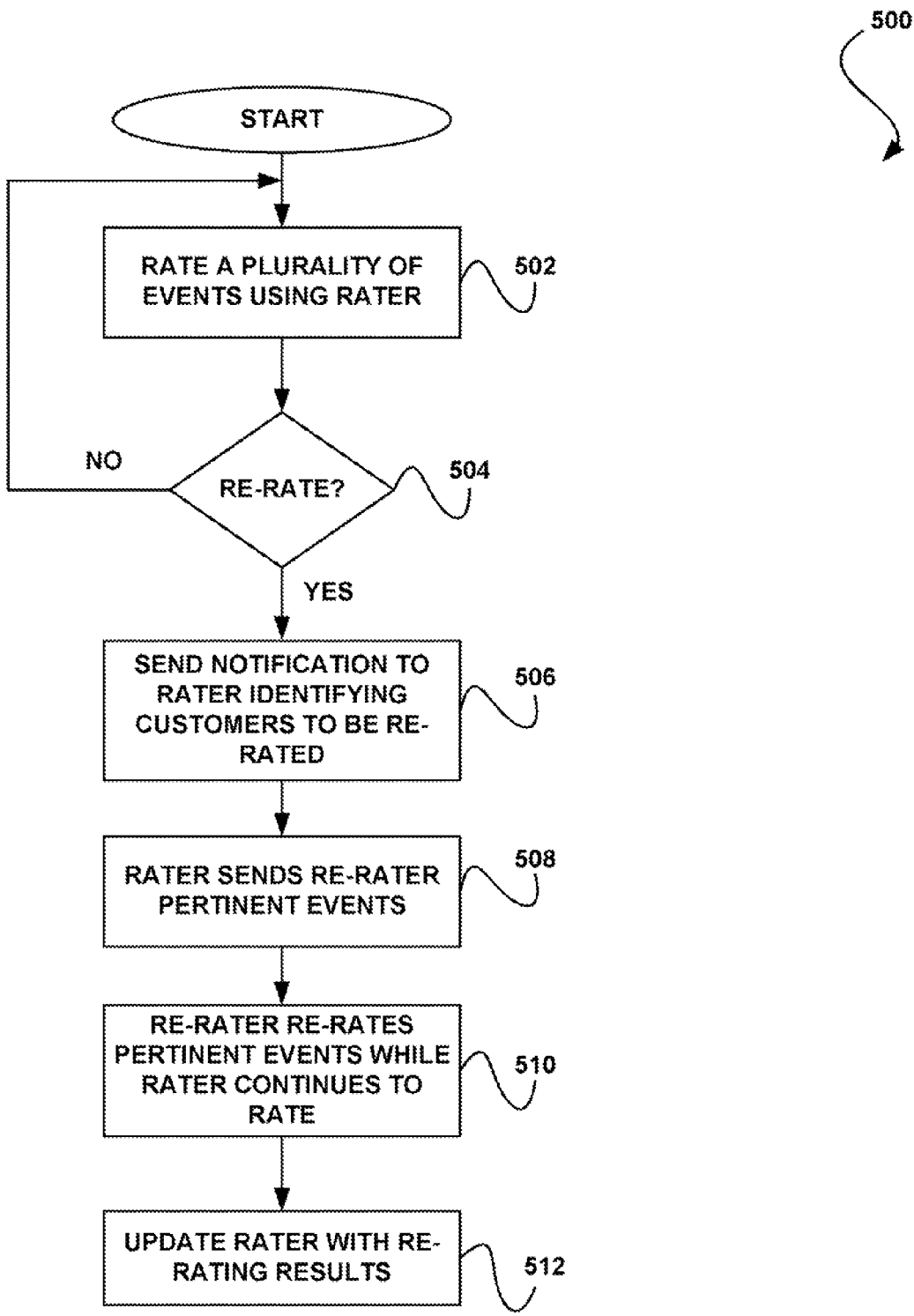
FIG. 5 shows a method for rating and re-rating events in parallel, in accordance with another embodiment.

FIG. 5 shows a method 500 for rating, and re-rating events in parallel, in accordance with one embodiment. As an option, the method 500 may be implemented in the context of the details of FIGS. 1-4. For example, the method 500 may reflect use of the system 400 of FIG. 4. Of course, however, the method 500 may be carried out in any desired environment. Further, the aforementioned definitions may equally apply to the description below.

As shown in operation 502, a rater (e.g. the rater 402 of FIG. 4) rates a plurality of events. As mentioned earlier, such rating may be accomplished in a variety of ways. For example, in one embodiment, the rating process may take into account various event data and performance indicators when rating such events.

While rating, it is determined whether one or more events should be re-rated, as indicated in decision 504, it may be determined that an event should be re-rated for a number of reasons. For example, a performance indicator corresponding to associated event data, or rating results, may be compared to a threshold. Thus, when the performance indicator reaches the threshold, it may be determined that the corresponding event(s) should be re-rated and the re-rating process initiated.

It should be noted that such need for re-rating may be determined in a variety of ways. For example, in one embodiment, the need for re-rating may be determined based on one or more business rules, for example, when a threshold is reached. In another embodiment, the need for re-rating may be determined based on a certain business promotion. In yet another embodiment, the need for re-rating may be determined by an indicator or instruction sent to a rater specifically by either a system operator or by a billing system.

For example, in one embodiment, a customer may have subscribed to a telephone plan that allows for certain discounts once the customer has reached a certain call threshold. Thus, event data in the form of a number of calls may be monitored and tracked in a performance indicator. The performance indicator may be compared to a predetermined call threshold in order to determine whether the telephone plan should be re-rated, for example. Once the customer has reached the predetermined call threshold, the re-rating process may be invoked.

If, in decision 504, it is determined that one or more events should be re-rated by a re-rater (e.g. the re-rater 404 of FIG. 4), a notification is sent from the re-rater to the rater identifying the customers associated with the desired re-rating. See operation 506. Once the notification has been sent to the rater identifying the customers, the rater sends the re-rater all pertinent events to be re-rated, as shown in operation 508. Such pertinent events may be any number of events associated with pertinent customers.

The re-rater then re-rates the events while the rater continues to rate events in parallel with the re-rating, as shown in operation 510. For example, the rater may continue to rate events using a first database (e.g. the first database 406 of FIG. 4) containing data related to the select customers (e.g. their relevant offers and parameters). On the other hand, the re-rater may use a second database (e.g. the second database 408 of FIG. 4) in order to perform the re-rating process by initializing and updating various performance indicators, etc.

In other embodiments, the rater and the re-rater may use the same database. In this situation, the database may be partitioned so that the rater and the re-rater may use separate partitions, for example. Further, in still another embodiment, the rater and the re-rater may both use a first database containing data related to the customers (e.g. their relevant offers and parameters), and upon invoking the re-rating process, the re-rater may utilize a second database to initialize and update the various performance indicators.

Because the re-rating process may use a separate database for initializing and updating the performance indicators, the rating process may continue using the first database (e.g. the production environment) in parallel, without resulting in any conflict between the rating and the re-rating processes. Thus, all events coming to the rater which are to be re-rated may be sent to the re-rater. It should be noted that this may be accomplished continuously or on a periodic basis.

Furthermore, the pertinent events may continue to be sent by the rater to the re-rater, in conjunction with the rating and the re-rating process already occurring. In this situation, the re-rater may then continue to re-rate events that have been dispatched from the rater while the re-rater continues processing. In possible embodiment, the re-rater may utilize a snapshot taken of the first database in order to perform the re-rating.

In another embodiment, the rater may query the re-rater in order to get a real-time summary of information, for instance a summary of changes in the performance indicators in order to calculate a more accurate rating. For example, in one embodiment, the rater may receive a snapshot of the second database where the re-rater is updating performance indicators, in order to provide more accurate rating.

In the context of telecommunications, a situation may arise where, during the re-rating process, customer events may reflect use of an additional ten minutes of a free minutes allowance. As a result of such additional use, it may be desired to reduce the monetary charges for the relevant events, for example. In this case, the event being rated (e.g. in real-time) may be reduced by the available allowance of ten minutes for rating purposes. Further, by re-rating in this fashion, other functionality (e.g. a spending limit) may be articulated more realistically.

Once the re-rater has re-rated the events, the rater is updated with the results from the re-rating, as shown in operation 512. Such updating can occur in a variety of was. For example, in one embodiment, the re-rater ma utilize a separate module (e.g. a dispatcher module) to send the re-rating results from a database corresponding to the re-rater to another database corresponding to the rater.

Additionally, in one possible embodiment, a duplicate check mechanism may be used in order to update the first database (associated with the rater) with the re-rated events from the second database (associated with the re-rater). Further, in one embodiment, such duplicate check mechanism may be located in the separate module (e.g. the dispatcher), for example. Still yet, the first database may be updated with only the rating results that are requested by the rater, for efficiency purposes, etc.

Once the re-rating results have been transferred to the first database corresponding to the rater, such re-rating results may be used for all subsequent rating. Furthermore, in one embodiment, a notification may be sent to the rater indicating that the re-rating has been completed for the customer(s) and that further dispatching of events to the re-rater for the customer(s) is no longer required.

In one optional embodiment, the re-rater may also record and maintain a summary of the differences found from previously rated/re-rated events and the results of the current re-rating. Additionally, this summary information may include a summary of differences in monetary charges and allowances, for example. Thus, in a situation where the customer has a prepaid balance, the differences in a monetary amount may be gathered and given as an adjustment (either positive or negative) to the customer's prepaid balance at the end of re-rating process, for example.

In another embodiment, where the customer's balance is post-paid (e.g. after the events), performance indicators may be updated utilizing the re-rating process. Thus, the subscriber may not require any adjustments and may only be charged for the actual amount calculated after the re-rating process, as part of a periodic invoicing process, for example.

Figure 6:
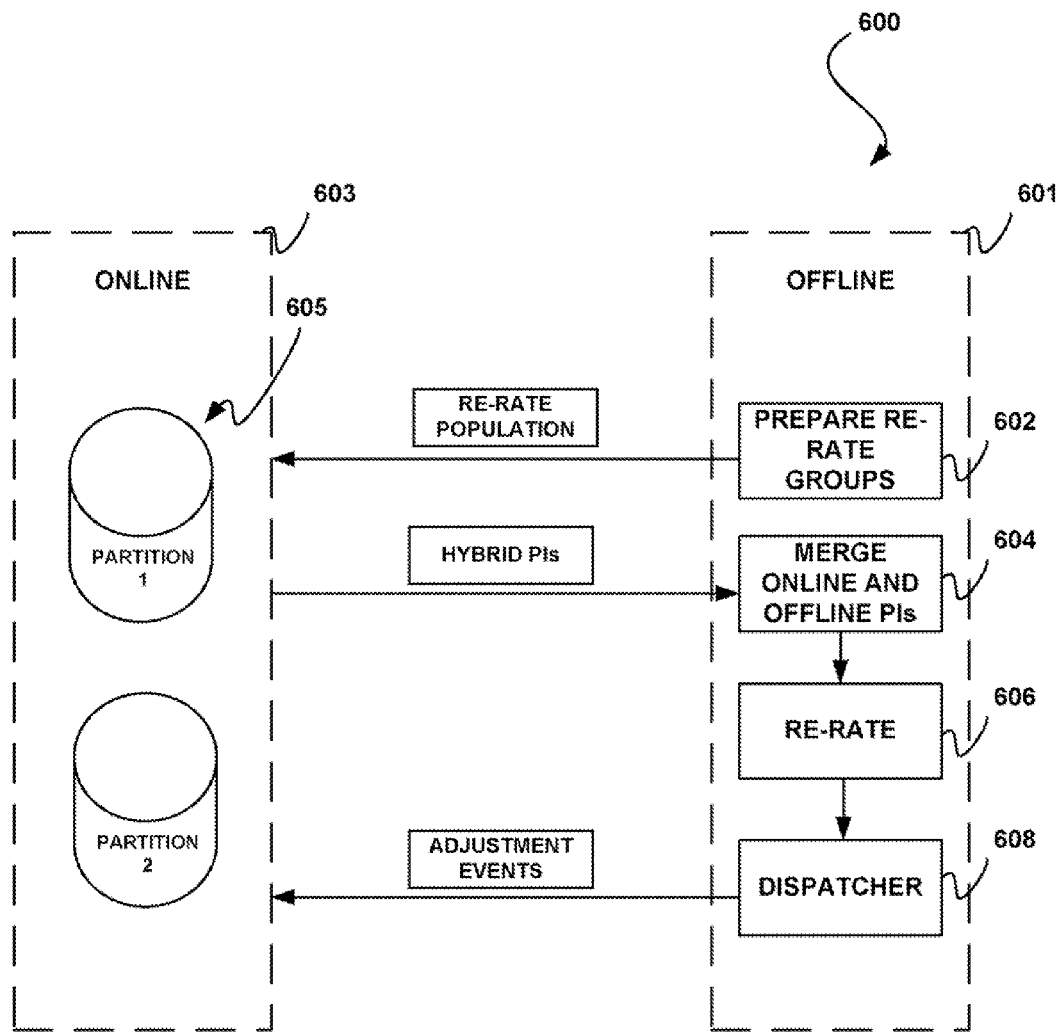
FIG. 6 shows a re-rating process flow, in accordance with one embodiment.

FIG. 6 shows a re-rating process flow 600, in accordance with one embodiment. As an option, the process flow 600 may be implemented in the context of the details of FIGS. 1-5. Of course, however, the process flow 600 may be carried out in any desired environment. Further, the aforementioned definitions may equally apply to the description below.

As shown in operation 602, groups of events to be re-rated are prepared on an offline platform 601 and sent to an online platform 603. Further, as shown in operation 604, performance indicators (PIs) are extracted from the online platform 603 to the offline platform 601. The extracted online performance indicators may then be merged with performance indicators which are stored offline.

In order to minimize the number of events to be extracted for re-rating and thereby make the re-rating process more efficient, the events and performance indicators may optionally have a "tag." The tag can be defined as, for example, the date when the event was processed. In one embodiment, there may be a separate performance indicator created whenever there is a different tag. Once there is any need for re-rating, only the relevant events and the relevant performance indicator are extracted. For example, if there is a problem found that affects rates from the 15th of the month and in case the "tag" is defined as the date of the month, the re-rating may initialize the accumulators from before that specific tag (in this example, the $14^{th}$ of the month) and extract events from the specific tag (in this example, the $14^{th}$ of the month). The present technique may thus avoid re-rating events from the beginning of the month until the $14^{th}$ of the month.

It should be noted that the extraction of the online performance indicators may be performed by join operation between a re-rater table and a performance indicator table. In one embodiment, a re-rate extract command may create a list of all customers which may be the subject of re-rating. Furthermore, such re-rate extract command may verify that the customers have data in an online partition 605 so that the extract may occur.

In order to recognize that the customer has information in the online platform 603, a required partitions attribute may be used from a customer parameter table, for example. In one embodiment, the customer groups to be re-rated may be divided according to a customer sub-partition, for example.

In another embodiment, the groups may be divided according to an online partition parameter which may have also been taken from the customer parameter table. In this situation, a list of customers corresponding to online partitions may be sent and each customer group to be re-rated can run independently when the result is returned to the offline partition, for example.

Additionally, in the online partition, the list may be loaded to a dummy subscriber re-rating table and join operation may be performed in order to extract the information from the table. The information extracted may be hybrid performance indicators and re-rateable performance indicators. The decision of which type of performance indicator is to be extracted may be configurable so that, for a re-calculate mode, no re-rateable performance indicators will be extracted, for example.

It should be noted that the aforementioned re-calculate mode may be a variant of the re-rate process, which is applied to non re-rateable events. In one embodiment, the events and performance indicators are not modified, but an adjustment for the event or performance indicator is created and sent to the online platform 603 in order to affect their corresponding balances (by re-rating, etc.). The adjustment may be negative or positive, and the decision whether to apply the adjustment may be left to implementation in a separate process, for example.

Further, in the context of the present embodiment, hybrid performance indicators may refer to performance indicators which accumulate re-rateable events and non re-rateable events. There are many situations that might cause a hybrid performance indicator. For example, in one embodiment, there may be shared allowances/monetary discounts for pre-paid and post-paid customers. In such a case, a hybrid performance indicator may be used. Additionally, in another embodiment, one subscriber may have both pre-paid and post-paid services which create a need for a hybrid performance indicator.

Further, in another embodiment, a customer may have a calling plan where business calls (e.g. during normal work hours) are distributed to a post-paid account, and the customers private calls (e.g. after normal work hours) are distributed to a pre-paid account, for example. In such case, a hybrid performance indicator may be appropriate.

Furthermore, it should be noted that performance indicators may be input to the re-rate processes for a variety of purposes. For example, in one embodiment, where there is a non-re-rateable portion of the performance indicator, in addition to a re-rateable portion, the performance indicator may be used as initial value for the non re-rateable part of the performance indicator. Furthermore, in another embodiment, the performance indicators may be input to the re-rate process in order to compare between the performance indicator before the re-rate process and after the re-rate process.

In addition, once the online and offline performance indicators have been merged in operation 604, the performance indicators are re-rated using a re-rater, as shown in operation 606. Once the re-rating process has been completed, the re-rater activates new end re-rate handlers. Such end re-rate handlers may be able to access the performance indicator both before the re-rate process and after the re-rate process.

By having access to the performance indicators before and after the re-rate process, the performance indicator before the re-rating process and the performance indicator after the re-rating process may be compared and an event adjustment determined. Further, an adjusted event may then be generated based on the comparison.

Additionally, the adjusted events may be sent to a dispatcher, and in turn, to an online partition, as shown in operation 608. There, the event may be processed and the required adjustment applied to the performance indicator. Thus, the adjustment may affect the performance indicator in the online platform.

Figure 7:
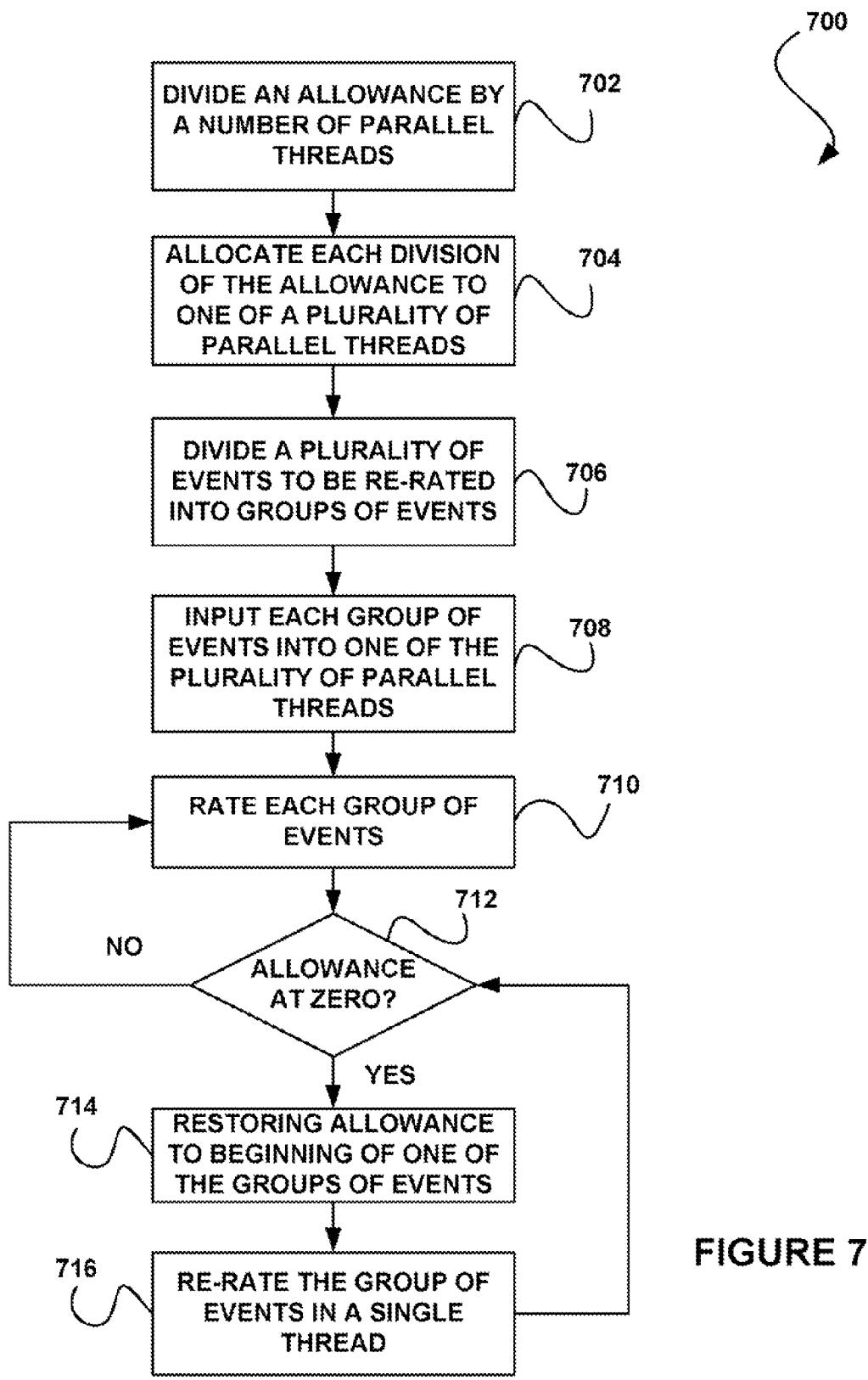
FIG. 7 shows a method for re-rating customers, in accordance with yet another embodiment.

FIG. 7 shows a method 700 for re-rating customers, in accordance with yet another embodiment. As an option, the method 700 may be implemented in the context of the details of FIGS. 1-6. Of course, however, the method 700 may be carried out in any desired environment. Further, the aforementioned definitions may equally apply to the description below.

As shown in operation 702, an allowance is divided by a number of parallel threads. In the context of the present embodiment, an allowance may refer to any allocation of resources. For example, in various embodiments, the allowance may include, but is not limited to pre-purchased or "free minutes" allocated to a customer. Further, in the context of the present description, a thread is a fork (or split) of a program or process that allows for two or more simultaneously (or pseudo-simultaneously) running tasks. In use, such threads may be used to simultaneously rate or re-rate separate groups of events in parallel, for example.

As shown in operation 704, each division of the allowance is allocated to one of a plurality of parallel threads. For example, if rating or re-rating is to be accomplished with 10 parallel threads, 1/10 of the allowance would be allocated to each of the 10 parallel threads. Of course, the number of threads to be used is in no way limited, as any number of desired threads may be used when implementing the method 700.

Additionally, in operation 706, a plurality of events which are to be re-rated are divided into groups of events, for the purpose of applying each group of events to an associated portion of the allowance by way of the corresponding thread. For example, in the case of 10 parallel threads (as set forth above), a list of 100,000 events to be re-rated (for example) may be divided into groups of 10,000 events to be applied to a corresponding one of the 10 threads. Of course, in various embodiments, such events may be divided in any desired uniform or varied manner, based on a variety of criteria. For example, in one embodiment, such list of events to be re-rated may be sorted based on certain event criteria or otherwise organized in a specific manner.

Further, in operation 708, each group of events is input into one of the plurality of parallel threads. For example, each group of events may be input into a separate thread. After each group of events is input into one of the plurality of parallel threads, each group of events is rated as shown in operation 710. Thus, each division of the allowance may be reduced according to the rating of the group of events being rated/re-rated in a particular thread.

Additionally, in decision 712, it is determined if the allowance has been reduced to zero, due to the rating of one of the plurality of parallel threads. If it is determined that the allowance has been reduced to zero, the allowance is restored (e.g. rolled back) to the beginning of the group of events, as shown in operation 714. That group of events is then re-rated in a single thread, as shown in operation 716. This re-rating may allow for correct processing of a particular event that zeros the allowance. While not shown, it should be noted that operation 710 may continue to be performed for any other thread, such that the other threads continue to run in parallel, etc.

Thus, in one embodiment, the method 700 may be used to re-rate large customers with millions of events, for example. Specifically, the method 700 allows re-rating to run in parallel based on the fact that, during a re-rate operation with a shared allowance, only a single event really needs to lock a shared allowance. Such event is that which reduces the allowance to zero. All the remaining events (e.g. those that precede and those that follow such event, etc.) do not necessarily need such locking mechanism.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
rating, utilizing at least one processor, a plurality of events associated with at least one customer, the rating utilizing a rater, and the rating including determining an amount to be charged for each of the plurality of events;
storing, using a memory, results of the rating for the at least one customer in a first database, the stored rating results including performance indicators corresponding to associated event data;
while rating the plurality of events associated with the at least one customer, utilizing the at least one processor, determining that a particular event of the plurality of events associated with a particular customer of the at least one customer is to be re-rated, the determination based on:
a comparison of a threshold with a performance indicator corresponding to data of the particular event, and
the performance indicator corresponding to the data of the particular event reaching the threshold;
sending a notification, utilizing the at least one processor, including information on the particular customer subject to the re-rating to the rater from a re-rater separate from the rater in response to the determination that the particular event is to be re-rated, the notification identifying the particular customer in association with which the re-rating is to be performed; in response to the notification, providing the re-rater, from the rater, with the particular event associated with the particular customer subject to the re-rating;
in response to receiving the particular event associated with the particular customer subject to the re-rating, utilizing a second database separate from the first database to initialize and update the performance indicator corresponding to the data of the particular event;
re-rating, utilizing the re-rater, the particular event associated with the particular customer subject to the re-rating, in parallel with the rating such that the re-rating is performed by the re-rater while the rater continues to rate at least one of the events associated with the at least one customer not subject to the re-rating, the re-rating including re-determining the amount to be charged for the particular event;
storing re-rating results of the re-rating in the second database separate from the first database; and
updating the rater with the re-rating results of the re-rating.

2. The method of claim 1, wherein the plurality of events are rated utilizing a pre-paid billing system.

3. The method of claim 1, wherein the plurality of events are rated in real-time.

4. The method of claim 1, wherein the threshold is defined by at least one business rule.

5. The method of claim 1, wherein the first database is updated with the re-rating results stored in the second database.

6. The method of claim 1, wherein information associated with a difference between the rating results and the re-rating results is gathered for use in a pre-paid billing system, and a pre-paid balance is adjusted utilizing the information.

7. The method of claim 1, wherein the first database is updated with only the re-rating results that are requested by the rater.

8. The method of claim 1, wherein the re-rating is performed utilizing a snapshot taken of the first database.

9. The method of claim 1, wherein the events are tagged for use during the re-rating.

10. The method of claim 1, further comprising:
dividing an allowance by a number of parallel threads;
allocating each division of the allowance to one of a plurality of the parallel threads;

dividing a plurality of events to be re-rated into groups of events;
applying each group of events to one of the plurality of parallel threads; and
rating each group of events.

11. The method of claim 10, further comprising:
determining if at least a portion of the allowance has been reduced to zero;
restoring at least a portion of the allowance; and
re-rating at least one of the groups of events.

12. A computer program product embodied on a non-transitory computer readable medium executed by a processor, comprising:
computer code for rating, utilizing a rater, a plurality of events associated with at least one customer, the rating including determining an amount to be charged for each of the plurality of events;
computer code for storing results of the rating for the at least one customer in a first database, the stored rating results including performance indicators corresponding to associated event data;
computer code for, while rating the plurality of events associated with the at least one customer, determining that a particular event of the plurality of events associated with a particular customer of the at least one customer is to be re-rated, the determination based on:
a comparison of a threshold with a performance indicator corresponding to data of the particular event, and
the performance indicator corresponding to the data of the particular event reaching the threshold;
computer code for sending a notification including information on the particular customer subject to the re-rating to the rater from a re-rater separate from the rater in response to the determination that the particular event is to be re-rated, the notification identifying the particular customer in association with which the re-rating is to be performed;
computer code for, in response to the notification, providing the re-rater, from the rater, with the particular event associated with the particular customer subject to the re-rating;
computer code for, in response to receiving the particular event associated with the particular customer subject to the re-rating, utilizing a second database separate from the first database to initialize and update the performance indicator corresponding to the data of the particular event;
computer code for re-rating, utilizing the re-rater, the particular event associated with the particular customer subject to the re-rating, in parallel with the rating such that the re-rating is performed by the re-rater while the rater continues to rate at least one of the events associated with the at least one customer not subject to the re-rating, the re-rating including re-determining the amount to be charged for the particular event;
computer code for storing re-rating results of the re-rating in the second database separate from the first database; and
computer code for updating the rater with the re-rating results of the re-rating.

13. The computer program product of claim 12, wherein the plurality of events are rated utilizing a pre-paid billing system.

14. The method of claim 1, wherein the re-rater utilizes the second database to update the performance indicators in conjunction with the re-rating process.

15. The method of claim 14, wherein the rating of the plurality of events utilizing the first database continues while the re-rater updates the performance indicators in conjunction with the re-rating process.

16. The method of claim 1, wherein the at least one customer has both re-rateable and non-re-rateable events which are accumulated to different performance indicators.

17. The method of claim 1, wherein the performance indicators include a non-re-ratable portion and a re-ratable portion, and are used as input to the re-rating, such that the performance indicator is used as an initial value for a non-re-rateable portion of the performance indicator.

18. The method of claim 1, wherein the performance indicators include one or more of an accumulation of call time, a number of calls, an amount of data transferred, a number of messages received, a number of songs downloaded, and an accumulation of event data.

19. The method of claim 1, wherein the rater sends a query to the re-rater for a summary of changes in performance indicators of re-rated events, for updating calculations used in the rating.

20. The method of claim 19, wherein, in response to the re-rater receiving the query, the re-rater provides to the rater a snapshot of the second database for updating the rating calculations.

21. A system, comprising:
at least one processor for:
rating a plurality of events associated with at least one customer, the rating utilizing a rater, and the rating including determining an amount to be charged for each of the plurality of events;
storing, in a memory, results of the rating for the at least one customer in a first database, the stored rating results including performance indicators corresponding to associated event data;
while rating the plurality of events associated with the at least one customer, determining that a particular event of the plurality of events associated with a particular customer of the at least one customer is to be re-rated, the determination based on:
a comparison of a threshold with a performance indicator corresponding to data of the particular event, and
the performance indicator corresponding to the data of the particular event reaching the threshold;
sending a notification including information on the particular customer subject to the re-rating to the rater from a re-rater separate from the rater in response to the determination that the particular event is to be re-rated, the notification identifying the particular customer in association with which the re-rating is to be performed;
in response to the notification, providing the re-rater, from the rater, with the particular event associated with the particular customer subject to the re-rating;
in response to receiving the particular event associated with the particular customer subject to the re-rating, utilizing a second database separate from the first database to initialize and update the performance indicator corresponding to the data of the particular event;
re-rating, utilizing the re-rater, the particular event associated with the particular customer subject to the re-rating, in parallel with the rating such that the re-rating is performed by the re-rater while the rater continues to rate at least one of the events associated with the at least one customer not subject to the re-rating, the re-rating including re-determining the amount to be charged for the particular event;
storing re-rating results of the re-rating in the second database separate from the first database; and
updating the rater with the re-rating results of the re-rating.

* * * * *

UNITED STATES PATENT AND TRADEMARK OFFICE
CERTIFICATE OF CORRECTION

| | | |
|---|---|---|
| PATENT NO. | : 8,341,044 B1 | Page 1 of 1 |
| APPLICATION NO. | : 11/758582 | |
| DATED | : December 25, 2012 | |
| INVENTOR(S) | : Patro et al. | |

It is certified that error appears in the above-identified patent and that said Letters Patent is hereby corrected as shown below:

On the Title page:

Item (75) Inventors; second line; please replace "Gun" with --Gan--;

Item (57) Abstract; line 2; please replace "events in" with --events. In--.

Signed and Sealed this
Twenty-first Day of April, 2015

Michelle K. Lee
*Director of the United States Patent and Trademark Office*